United States Patent
Mizrahi (10) Patent No.: US 9,614,819 B2
(45) Date of Patent: Apr. 4, 2017

(54) METHOD AND APPARATUS FOR SECURING CLOCK SYNCHRONIZATION IN A NETWORK

(71) Applicant: MARVELL ISRAEL (M.I.S.L) LTD., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 49 days.

(21) Appl. No.: 14/534,371

(22) Filed: Nov. 6, 2014

(65) Prior Publication Data

US 2015/0117471 A1    Apr. 30, 2015

Related U.S. Application Data

(62) Division of application No. 14/521,810, filed on Oct. 23, 2014.

(60) Provisional application No. 61/911,855, filed on Dec. 4, 2013, provisional application No. 61/895,192, filed on Oct. 24, 2013.

(51) Int. Cl.
  *H04L 29/06* (2006.01)
  *H04J 3/06* (2006.01)

(52) U.S. Cl.
  CPC ........ *H04L 63/0485* (2013.01); *H04J 3/0667* (2013.01); *H04L 63/0428* (2013.01); *H04L 63/12* (2013.01)

(58) Field of Classification Search
  None
  See application file for complete search history.

(56) References Cited

U.S. PATENT DOCUMENTS

| | | | |
|---|---|---|---|
| 8,416,763 B1 | 4/2013 | Montini | |
| 2005/0120213 A1 | 6/2005 | Winget | |
| 2006/0112431 A1* | 5/2006 | Finn | H04L 63/08 726/22 |
| 2008/0260151 A1* | 10/2008 | Fluhrer | H04L 63/04 380/255 |
| 2010/0058101 A1 | 3/2010 | Shahid | |
| 2010/0098111 A1* | 4/2010 | Sun | H03L 7/0807 370/509 |
| 2011/0052206 A1* | 3/2011 | Zheng | H04J 3/0697 398/154 |
| 2012/0026869 A1* | 2/2012 | Wang | H04L 41/5003 370/230 |
| 2012/0082156 A1 | 4/2012 | Swartzentruber | |
| 2013/0114601 A1 | 5/2013 | Branscomb | |
| 2013/0170507 A1 | 7/2013 | Hsueh | |
| 2013/0191628 A1* | 7/2013 | Nedeltchev | H04L 63/0272 713/153 |
| 2014/0010244 A1* | 1/2014 | Bui | H04J 3/0697 370/503 |

(Continued)

*Primary Examiner* — Yemane Mesfin
*Assistant Examiner* — Peter Chen (57) ABSTRACT

Aspects of the disclosure provide a method that includes receiving a first packet through a network at a first device. The first packet includes a first message generated according to a precision time protocol and a first encapsulation that encapsulates one or more fields of the first message. Further, the method includes security-verifying the first packet based on the first message and the first encapsulation, and processing the first message according to the precision time protocol after the first packet is security-verified.

20 Claims, 8 Drawing Sheets

(56) References Cited

U.S. PATENT DOCUMENTS

2014/0177653 A1\* 6/2014 Tzeng .................. H04J 3/0635
370/503

\* cited by examiner

METHOD AND APPARATUS FOR SECURING CLOCK SYNCHRONIZATION IN A NETWORK

INCORPORATION BY REFERENCE

This present disclosure is a divisional of U.S. patent application Ser. No. 14/521,810, "METHOD AND APPARATUS FOR SECURING CLOCK SYNCHRONIZATION IN A NETWORK" filed Oct. 23, 2014, which claims the benefit of U.S. Provisional Application No. 61/895,192, "Securing the Precision Time Protocol using TLV-based Tunneling" filed on Oct. 24, 2013, and U.S. Provisional Application No. 61/911,855, "IEEE 1588 Security Encapsulation Proposal" filed on Dec. 4, 2013. The entire disclosures of the above-identified applications are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Time synchronization protocols, such as precision time protocol (PTP), and the like, are used to provide time synchronization of nodes in a network. The PTP achieves high precision by hop-by-hop synchronization, where intermediate nodes can participate in the synchronization mechanism, thus eliminating inaccuracies caused by multiple network hops.

SUMMARY

Aspects of the disclosure provide a method that includes generating a first message having a plurality of fields according to a precision time protocol, encapsulating one or more fields of the first message into a first encapsulation, preparing a first packet that includes the first message and the first encapsulation, and transmitting the first packet through a network.

In an embodiment, the method includes measuring a transmitting time of the first packet, and generating a second message having a plurality of fields according to the precision time protocol. The second message includes the transmitting time of the first packet in a field. Further, the method includes encapsulating one or more fields of the second message into a second encapsulation, preparing a second packet that includes the second message and the second encapsulation, and transmitting the second packet through the network.

In another embodiment, the method includes predicting a transmitting time of the first packet, and integrating the predicted transmitting time into the first message.

According to an aspect of the disclosure, the method includes encapsulating the one or more fields of the first message into the first encapsulation according to an Internet protocol security (IPsec) protocol suite. According to another aspect of the disclosure, the method includes encapsulating the one or more fields of the first message into the first encapsulation according to a media access control (MAC) security (MACsec) standard.

Aspects of the disclosure provide another method. The method includes receiving a first packet through a network at a first device. The first packet includes a first message generated according to a precision time protocol and a first encapsulation that encapsulates one or more fields of the first message. Further, the method includes security-verifying the first packet based on the first message and the first encapsulation, and processing the first message according to the precision time protocol after the first packet is security-verified.

In an embodiment, the method includes receiving a second packet through the network at the first device. The second packet includes a second message having a transmitting time of the first packet at a second device and a second encapsulation that encapsulates one or more fields of the second message. The method then includes security-verifying the second packet based on the second message and the second encapsulation, and synchronizing a clock based on the transmitting time of the first packet at the second device and a receiving time of the first packet at the first device.

In another embodiment, the first message includes a predicted transmitting time of the first packet at the second device, and the method further includes synchronizing a clock of the first device based on the predicted transmitting time of the first packet at the second device, and a receiving time of the first packet at the first device.

According to an aspect of the disclosure, the second packet includes a timing correction to account for a delay between a transmission of the first packet at the second device and a reception of the first packet at the first device.

Further, in an example, the method includes forwarding the first packet, and measuring a first time of receiving the first packet and a second time of transmitting the first packet. Then, the method includes receiving a second packet through the network at the first device. The second packet includes a second message having a timing correction and a second encapsulation that encapsulates one or more fields of the second message. The method includes updating the timing correction to account for a delay between the second time and the first time, updating the second encapsulation with the updated timing correction, and forwarding the second packet.

Aspects of the disclosure provide an apparatus having a process and a transmitting circuit. The processor is configured to generate a first message having a plurality of fields according to a precision time protocol, encapsulate one or more fields of the first message into a first encapsulation, and prepare a first packet that includes the first message and the first encapsulation. The transmitting circuit is configured to transmit the first packet through a network.

Aspects of the disclosure provide another apparatus having a receiving circuit and a processor. The receiving circuit is configured to receive a first packet through a network and measure a first time of receiving the first packet. The first packet includes a first message generated according to a precision time protocol and a first encapsulation that encapsulates one or more fields of the first message. The processor is configured to security-verify the first packet based on the first message and the first encapsulation, and process the first message according to the precision time protocol after the first packet is security-verified.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
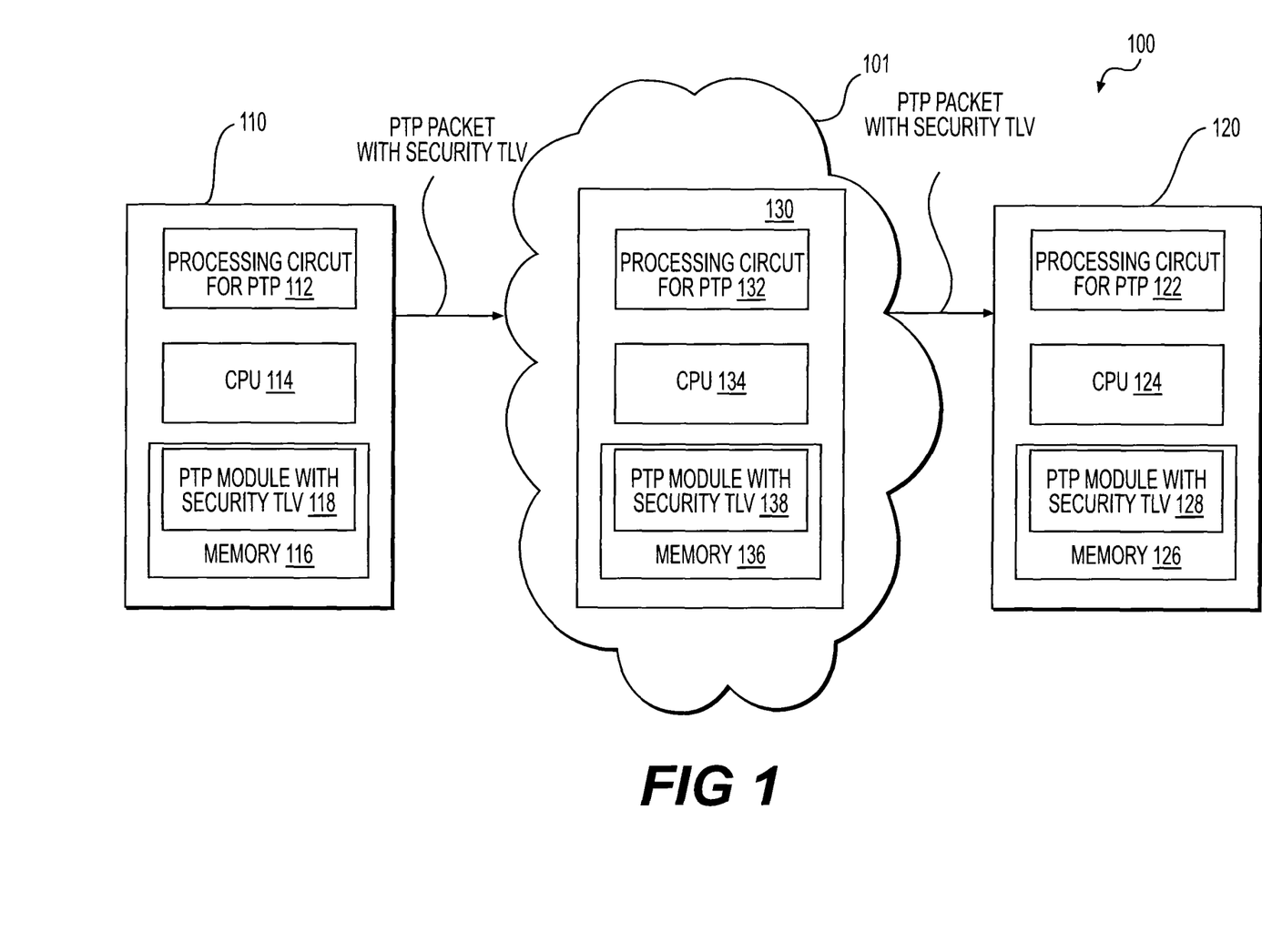
FIG. 1 shows a block diagram of a time synchronization system example 100 according to an embodiment of the disclosure.

FIG. 1 shows a block diagram of a time synchronization system example 100 according to an embodiment of the disclosure. The time synchronization system 100 includes a first device 110 and a second device 120 that are communicatively coupled together via a communication network 101. The time synchronization system 100 is time synchronized based on precision time protocol (PTP) with security protection.

According to an aspect of the disclosure, the first device 110 and the second device 120 can be any suitable terminal devices, such as desktop computers, laptop computers, network printers, servers and the like. The first device 110 and the second device 120 are configured in a master-slave architecture for time synchronization, in an embodiment. For example, the first device 110 is configured to be a master clock device and the second device 120 is configured to be a slave clock device. The master clock device sends PTP packets to the slave clock device. The PTP packets are secured for integrity and/or authentication purpose. The slave clock device checks the packet integrity and/or authenticates the packet source, and then synchronizes its clock to the clock of the master clock device based on the timing information obtained from the PTP packets.

It is noted that the time synchronization system 100 can include more slave clock devices (not shown), and the master clock device distributes packets to the slave clock devices to synchronize the slave clock devices to the clock of the master clock device.

The communication network 101 can be wired, wireless, a local area network (LAN), a wireless LAN (WLAN), a fiber optical network, a wide area network (WAN), a peer-to-peer network, the Internet, etc. or any combination of these that interconnects the first device 110 and the second device 120. The communication network 101 includes intermediate devices 130 that receive the packets with timing information, and forward the PTP packets in a hop-by-hop manner. For example, each intermediate device 130 receives the PTP packets from a previous intermediate device 130, suitably processes the PTP packets, and forwards the processed PTP packets to a next intermediate device 130. The intermediate devices 130 can be any suitable electronic devices, such as network switches, routers, modems, access points, and the like.

In the FIG. 1 example, the first device 110 includes a processing circuit 112 configured for PTP processing, a central processing unit (CPU) 114, and a memory 116 storing a PTP module 118 with security protection. In an embodiment, the processing circuit 112 includes hardware to perform accurate time stamping on PTP packets. For example, the processing circuit 112 maintains a clock, and measures timing, such as a transmitting time of a PTP packet, and the like according to the clock. In an example, the processing circuit 112 includes a counter circuit (not shown) configured to maintain the clock.

The CPU 114 is configured to execute software instructions, such as instructions in the PTP module 118 with security protection. The PTP module 118 is configured to cause the CPU 114 to generate PTP packets with security protection. In an embodiment, the time synchronization system 100 is configured to use a two-step synchronization technique, and the PTP module 118 is configured to cause the CPU 114 to generate a first PTP packet with security protection and a second PTP packet with security protection as a follow up packet of the first PTP packet. In an example, the follow up packet carries a transmitting time of the first PTP packet.

In another embodiment, the time synchronization system 100 is configured to use a one-step synchronization technique, and the PTP module 118 is configured to cause the CPU 114 to generate a PTP packet with security protection. The PTP packet carries a predicted transmitting time of the PTP packet.

The PTP packets with security protection can be generated according to any suitable security protocol, such as an Internet protocol security (IPsec) protocol suite, a media access control (MAC) security (MACsec) standard, and the like.

In an embodiment, a PTP packet with security protection includes five fields. The first field includes a transport header. The transport header can be any suitable header of a data link layer, a network layer and a transport layer, such as a transport header according to IPv4 with UDP, a transport header according IPv6 with UDP, a transport header according to Ethernet, a transport header according to DeviceNET, a transport header according to ControlNET, a transport header according to IEC 6158, and the like.

The second field includes a PTP header that can be a header of a session layer, a presentation layer, and an application layer according to a PTP protocol. The third field includes PTP payloads, such as a transmitting time, a timing correction, and the like. The fourth field is for type/length/value (TLV), and can include 0 or more TLVs. The fifth field is used for security protection, and is configured as security TLV. The security TLV can be generated according to a suitable security protocol or standard, such as IPsec protocol suite, MACsec standard, and the like.

In an example, the security TLV is generated according to an IPsec protocol suite in a suitable mode, such as in an encrypted mode (ESP) of the IPsec protocol suite, in an authenticated mode (AH) of the IPsec protocol suite, in a transport mode of the IPsec protocol suite, in a tunnel mode of the IPsec protocol suite, and the like. For example, the security TLV includes three sub-fields. The first sub-field is for IP and IPsec header, and includes IP addresses representing the master clock (e.g., the first device 110). The second sub-field includes a protected encapsulation according to the IPsec, and the third sub-field includes IPsec trailer. In an embodiment, the protected encapsulation includes a combination of a UDP header, the PTP header in the second field, the PTP payloads in the third field and the 0 or more TLVs in the fourth field. The combination is encrypted or authenticated to provide security protection.

In another embodiment, the security TLV is generated according to the IPsec protocol suite in the authenticated mode. The protected encapsulation includes a UDP header only that is authenticated to provide security protection, and the security TLV does not need to have the third sub-field.

In another example, the security TLV is generated according to an MACsec standard in a suitable mode, such as in an encrypted mode (ESP) of the MACsec standard, in an authenticated mode (AH) of the MACsec standard, and the like. For example, the security TLV includes three sub-fields. The first sub-field is for Ethernet and MACsec header that can include MAC addresses representing the master clock (e.g., the first device 110). The second sub-field includes a protected encapsulation according to the MACsec, and the third sub-field includes MACsec trailer. In an embodiment, the protected encapsulation includes a combination of the PTP header in the second field, the PTP payloads in the third field and the zero or more TLVs in the fourth field. The combination is encrypted or authenticated to provide security protection.

In an embodiment, the first device 110 includes other suitable components, such as an egress queue (not shown) configured to queue packets for transmission, a transmitting circuit (not shown) configured to transmit the PTP packets with security, and the like.

In the FIG. 1 example, the second device 120 includes a processing circuit 122 configured for PTP processing, a central processing unit (CPU) 124, and a memory 126 storing a PTP module 128 with security protection. In an embodiment, the processing circuit 122 includes hardware to perform accurate time stamping on PTP packets. For example, the processing circuit 122 maintains a clock, and measures timing, such as a receiving time of a PTP packet, and the like according to the clock. In an example, the processing circuit 122 includes a counter circuit (not shown) configured to maintain the clock.

The CPU 124 is configured, in an embodiment, to execute software instructions, such as instructions in the PTP module 128 with security protection. The PTP module 128 is configured to cause the CPU 124 to verify security of received PTP packets, process the PTP packets to synchronize the clock of the second device 120 to the clock of the first device 110. In an embodiment, the time synchronization system 100 is configured to use a two-step synchronization technique, and the PTP module 128 is configured to cause the CPU 124 to verify security of a first PTP packet and to verify security of a second PTP packet. Further, the PTP module 128 is configured to cause the CPU 124 to process the first PTP packet and the second PTP packet to synchronize the clock of the second device 120 to the clock of the first device 110. In an example, the PTP module 128 is configured to cause the CPU 124 to set the counter value of the counter circuit of the second device 120 to be about the same as the counter circuit in the first device 110.

In another embodiment, the time synchronization system 100 is configured to use a one-step synchronization technique, and the PTP module 128 is configured to cause the CPU 124 to verify security of a PTP packet, and process the PTP packet to synchronize the clock of the second device 120 to the clock of the first device 110.

The second device 120 can include other suitable components, such as a receiving circuit (not shown) configured to receive the PTP packets with security.

In the FIG. 1 example, the intermediate device 130 includes a processing circuit 132 configured for PTP processing, a central processing unit (CPU) 134, and a memory 136 storing a software module 138 for PTP with security protection. In an embodiment, the processing circuit 132 includes hardware to perform accurate time stamping on PTP packets. For example, the processing circuit 132 maintains a clock, and measures timing, such as a receiving time of a PTP packet, a transmitting time of the PTP packet, and the like according to the clock. In an example, the processing circuit 132 includes a counter circuit (not shown) to maintain the clock.

The CPU 134 is configured to execute software instructions, such as instructions in the software module 138 for PTP with security. The software module 138 is configured to cause the CPU 134 to verify security of a received PTP packet, process the PTP packet to update a timing correction in the PTP packet, and update a security TLV field in the PTP packet. In an embodiment, the time synchronization system 100 is configured to use a two-step synchronization technique, and the software module 138 is configured to cause the CPU 134 to verify security of a first received PTP packet and to verify security of a second received PTP packet. Further, the software module 138 is configured to cause the CPU 134 to update a timing correction in the PTP payloads of the second PTP packet based on a receiving time and a transmitting time of the first PTP packet at the intermediate device 130, and update the security, such as the security TLV of the second PTP packet.

In another embodiment, the time synchronization system 100 is configured to use a one-step synchronization technique, and the software module 138 is configured to cause the CPU 134 to verify security of a received PTP packet, update a timing correction based on a receiving time and a predicted transmitting time of the PTP packet at the intermediate device 130, and update the security, such as the security TLV of the PTP packet.

The intermediate device 130 can include other suitable components, such as a receiving circuit (not shown) configured to receive the PTP packets, an egress queue (not shown) configured to queue packets for transmission, and a transmitting circuit (not shown) configured to transmit the PTP packets.

According to an aspect of the disclosure, the time synchronization system 100 is upgraded from a PTP based time synchronization system without security protection. In an example, the hardware of the PTP based time synchronization system without security protection does not need to change, and the software of the PTP based time synchronization system, such as the software modules 118, 128 and 138, and the like, are upgraded to add the security protection.

Figure 2:
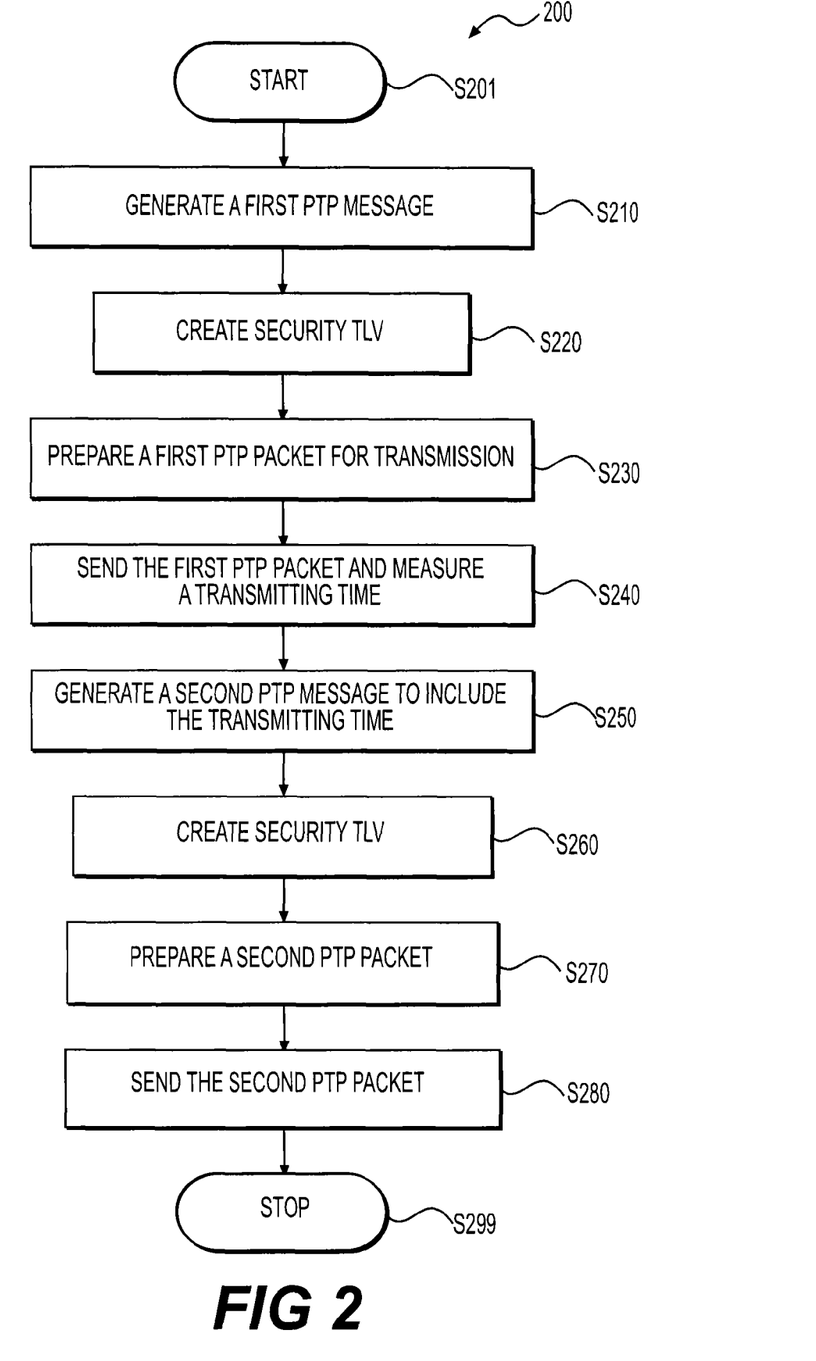
FIG. 2 shows a flow chart outlining a process example 200 performed by a master clock device according to an embodiment of the disclosure.

FIG. 2 shows a flow chart outlining a process example 200 performed by a master clock device in a time synchronization system according to an embodiment of the disclosure. In the FIG. 2 embodiment, the process 200 is used in a two-step time synchronization process in which the master clock device sends two packets for time synchronization. In an example, the process 200 is executed by the first device 110 in the time synchronization system 100. The process starts at S201 and proceeds to S210.

At S210, a first PTP message is generated. In an example, the first device 110 generates the first PTP message to cause the clock of the second device 120 to be synchronized to the clock of the first device 110. In an example, the first PTP message is a PTP packet that generally does not have security protection. For example, the first PTP message includes a first field for a transport header, a second field for a PTP header, a third field for PTP payloads and a fourth field for zero or more TLVs.

At S220, a first security TLV is created based on the first PTP message. In an embodiment, the first security TLV is generated according to suitable security protocol, such as the IPsec protocol suite, the MACsec standard, and the like. In an example, suitable fields of the first PTP message, such as at least one of the PTP header, the PTP payloads and the zero or more TLVs are encapsulated according to a security protocol to generate the first security TLV.

At S230, a first PTP packet with security protection is prepared for transmission. In an embodiment, the first security TLV is integrated with the first PTP message as a fifth field to generate the first PTP packet with security protection.

At S240, the first PTP packet with security protection is transmitted out and a transmitting time is measured. In the FIG. 1 example, the first device 110 puts the first PTP packet in a queue for transmission. At a time $T_1$ when the transmitting circuit of the first device 110 transmits the first PTP packet out of the first device 110, the time $T_1$ is measured. For example, the counter of the first device 110 is sampled when the transmitting circuit of the first device 110 transmits the first PTP packet, and the sampled counter value is stored in the first device 110.

At S250, a second PTP message is generated. In an example, the first device 110 generates the second PTP message as a follow-up message to the first PTP message. Similar to the first PTP message, the second PTP message does not have security protection, and includes a first field for a transport header, a second field for a PTP header, a third field for PTP payloads and a fourth field for zero or more TLVs. Further, the second PTP message includes the measured transmitting time $T_1$ of the first PTP packet, for example in the third field for PTP payloads.

At S260, a second security TLV is created based on the second PTP message. In an embodiment, the second security TLV is generated according to a suitable security protocol, such as the IPsec protocol suite, the MACsec standard, and the like. In an example, suitable fields of the second PTP message, such as at least one of the PTP header, the PTP payloads and the zero or more TLVs, are encapsulated according to a security protocol to generate the second security TLV.

At S270, a second PTP packet with security protection is prepared for transmission. In an embodiment, the second security TLV is integrated with the second PTP message as a fifth field to generate the second PTP packet with security protection.

At S280, the second PTP packet with security protection is transmitted out. In the FIG. 1 example, the first device 110 puts the second PTP packet in the egress queue for transmission, and the transmitting circuit of the first device 110 transmits the second PTP packet out of the first device 110. The process proceeds to S299 and terminates.

Figure 3:
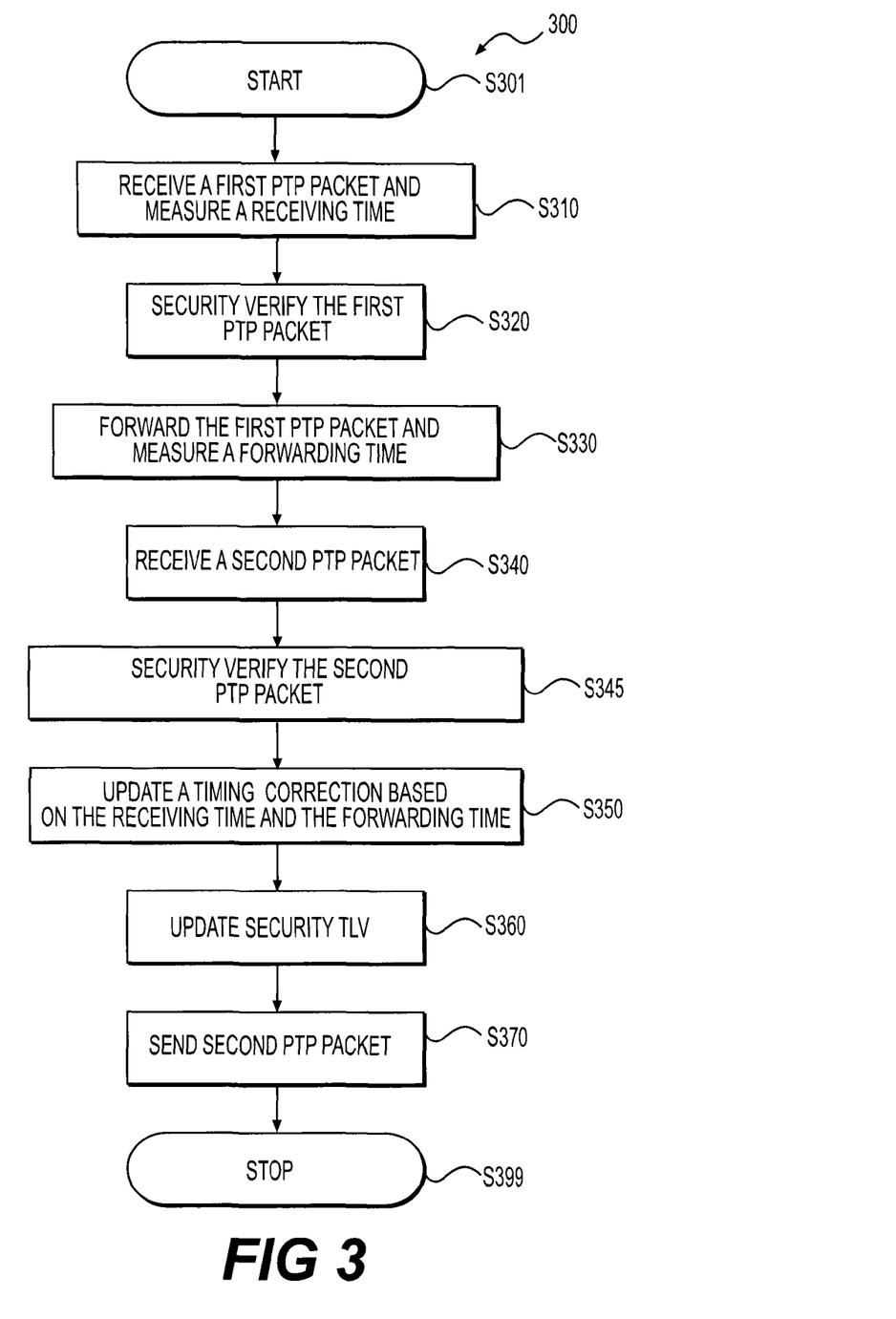
FIG. 3 shows a flow chart outlining a process example 300 performed by an intermediate device according to an embodiment of the disclosure.

FIG. 3 shows a flow chart outlining a process example 300 performed by an intermediate device according to an embodiment of the disclosure. In the FIG. 3 embodiment, the process 300 is used in a two-step time synchronization process that the intermediate device receives and forwards two packets for time synchronization. In an example, the process 300 is executed by the intermediate device 130 in the time synchronization system 100. The process starts at S301 and proceeds to S310.

At S310, a first PTP packet with security protection is received and a receiving time is measured. In an example, the intermediate device 130 receives the first PTP packet with security protection, and measures a time $T_R$ when the first PTP packet with security protection is received. For example, the counter of the intermediate device 130 is sampled when the receiving circuit of the intermediate device 130 receives the first PTP packet, and the sampled counter value is stored in the intermediate device 130.

At S320, the first PTP packet with security protection is security verified. In an embodiment, the first PTP packet includes a first field having a transport header, a second field having a PTP header, a third field having PTP payloads, a fourth field having zero or more TLVs and a fifth field having a security TLV. The security TLV is generated according to suitable security protocol, such as the IPsec protocol, the MACsec protocol, and the like. In an example, the security TLV includes an encapsulation of suitable fields of the first PTP packet, for example at least one of the PTP header, the PTP payloads and the zero or more TLVs, according to a security protocol. In an example, to verify the security, the security TLV is used to authenticate the source of the first PTP packet according to a suitable security protocol. In another example, to verify the security, the security TLV is used to check the integrity of the first PTP packet according to a suitable security protocol.

At S330, the first PTP packet with security protection is forwarded and a forwarding time is measured. In an embodiment, the intermediate device 130 puts the first PTP packet in the egress queue for transmission. At a time when the transmitting circuit of the intermediate device 130 forwards the first PTP packet out of the intermediate device 130, the forwarding time $T_F$ is measured. For example, the counter of the intermediate device 130 is sampled when the transmitting circuit of the intermediate device 130 transmits the first PTP packet, and the sampled counter value is stored in the intermediate device 130.

At S340, a second PTP packet with security protection is received. In an example, the intermediate device 130 receives the second PTP packet with security protection. Similar to the first PTP packet with security protection, the second PTP packet includes a first field having a transport header, a second field having a PTP header, a third field having PTP payloads, a fourth field having zero or more TLVs and a fifth field having a security TLV. In an example, the PTP payloads include the transmitting time $T_1$ of the first PTP packet from the first device 110. The security TLV is generated according to suitable security protocol, such as the IPsec protocol, the MACsec protocol, and the like. In an example, the security TLV includes an encapsulation of suitable fields of the first PTP packet, for example at least one of the PTP header, the PTP payloads and the zero or more TLVs, according to a security protocol.

At S345, the second PTP packet with security protection is security verified. In an example, to verify the security, the security TLV is used to authenticate the source of the second PTP packet to be the master clock device, such as the first device 110, according to a suitable security protocol. In another example, to verify the security, the security TLV is used to check the integrity of the second PTP packet according to a suitable security protocol.

At S350, a timing correction is updated according to the receiving time $T_R$ and the forwarding time $T_F$ of the first PTP packet. In an example, PTP payloads of the second PTP packet include a timing correction $T_C$ updated from a previous node in the network 101. When the previous node is the first device 110, the timing correction $T_C$ is zero in an example. Further, a new timing correction $T_{C\text{-}NEW}$ is calculated as a sum of the timing correction $T_C$ in the second PTP packet and a time difference (e.g., $T_F$–$T_R$) of the forwarding time $T_F$ to the receiving time $T_R$ as shown in Eq. 1:

$$T_{C\text{-}NEW} = T_C + (T_F - T_R) \qquad \text{Eq. 1}$$

Then, the timing correction $T_C$ in the PTP payloads of the second PTP packet is replaced by the new timing correction $T_{C\text{-}NEW}$.

At S360, a security TLV of the second PTP packet is updated. In an embodiment, because the PTP payloads are changed due to the timing correction update, the second security TLV is re-generated according to the suitable security protocol, such as the IPsec protocol, the MACsec protocol, and the like.

At S370, the updated second PTP packet with security protection is transmitted out. In an embodiment, the intermediate device 130 puts the updated second PTP packet in the egress queue for transmission, and the transmitting circuit of the intermediate device 130 transmits the second PTP packet out of the intermediate device 130. The process proceeds to S399 and terminates.

Figure 4:
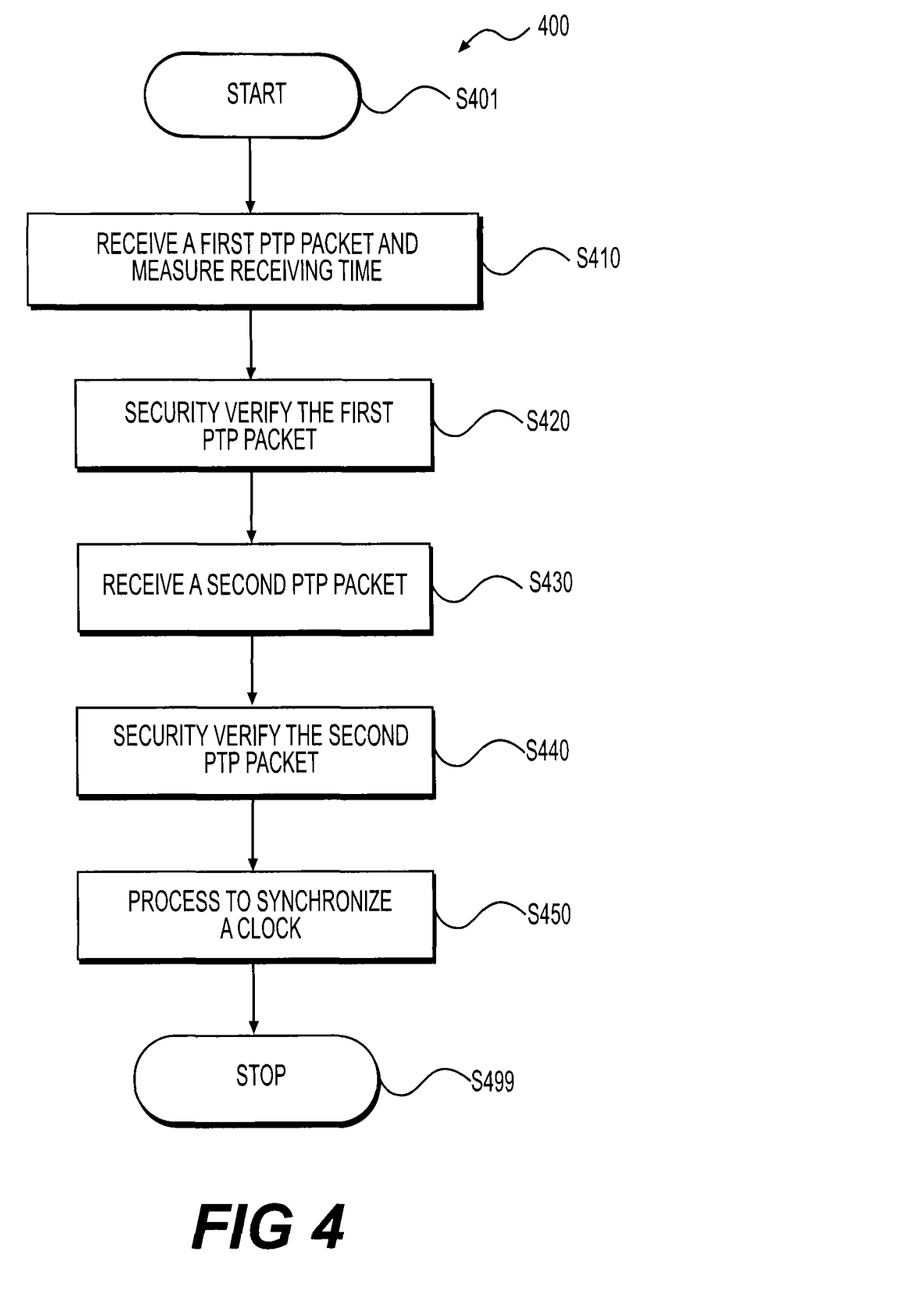
FIG. 4 shows a flow chart outlining a process example 400 performed by a slave clock device according to an embodiment of the disclosure.

FIG. 4 shows a flow chart outlining a process example 400 performed by a slave clock device in a time synchronization system according to an embodiment of the disclosure. In the FIG. 4 embodiment, the process 400 is used in a two-step time synchronization process that the slave clock device receives two packets for time synchronization. In an example, the process 400 is executed by the second device 120 in the time synchronization system 100. The process starts at S401 and proceeds to S410.

At S410, a first PTP packet with security protection is received and a receiving time is measured. In an example, the second device 120 receives the first PTP packet with security protection, and measures a time $T_2$ when the first PTP packet with security protection is received. For example, the counter of the second device 120 is sampled when the receiving circuit of the second device 120 receives the first PTP packet, and the sampled counter value is stored in the second device 120.

At S420, the first PTP packet with security protection is security verified. In an embodiment, the first PTP packet includes a first field having a transport header, a second field having a PTP header, a third field having PTP payloads, a fourth field having zero or more TLVs and a fifth field having a security TLV. The security TLV is generated according to suitable security protocol, such as the IPsec protocol, the MACsec protocol, and the like. In an example, the security TLV includes an encapsulation of suitable fields of the first PTP packet, for example at least one of the PTP header, the PTP payloads and the zero or more TLVs, according to a security protocol. In an example, to verify the security, the security TLV is used to authenticate the source of the first PTP packet according to a suitable security protocol. In another example, to verify the security, the security TLV is used to check the integrity of the first PTP packet according to a suitable security protocol.

At S430, a second PTP packet with security protection is received. In an example, the second device 120 receives the second PTP packet with security protection.

At S440, the second PTP packet is security verified. In an embodiment, the second PTP packet includes a first field having a transport header, a second field having a PTP header, a third field having PTP payloads, a fourth field having zero or more TLVs and a fifth field having a security TLV. The security TLV is generated according to suitable security protocol, such as the IPsec protocol, the MACsec protocol, and the like. In an example, the security TLV includes an encapsulation of suitable fields of the second PTP packet, for example at least one of the PTP header, the PTP payloads and the zero or more TLVs, according to a security protocol. In an example, to verify the security, the security TLV is used to authenticate the source of the second PTP packet according to a suitable security protocol. In another example, to verify the security, the security TLV is used to check the integrity of the second PTP packet according to a suitable security protocol.

At S450, the second PTP packet is processed to synchronize the clock of the second device 120 to the clock of the first device 110. In an example, the second device 120 calculates an offset $T_{OFFSET}$ of its own clock to the clock of the first device 110 based on the receiving time $T_2$ when the first PTP packet is received, and information in the PTP payloads of the second PTP packet. For example, the PTP payloads of the second PTP packet includes the transmitting time $T_1$ of the first PTP packet, and the timing correction $T_C$ that has been updated hop-by-hop along a path from the first device 110 to the second device 120. In an embodiment, the offset $T_{OFFSET}$ is a sum of the difference of $T_1$ to $T_2$ and the timing correction $T_C$, as shown by Eq. 2:

$$T_{OFFSET} = (T_1 - T_2) + T_C \qquad \text{Eq. 2}$$

The offset $T_{OFFSET}$ is the offset between the master clock of the first device 110 and the slave clock of the second device 120, thus the second device 120 can be synchronized to the first device 110 based on the offset $T_{OFFSET}$. In an example, the counter of the second device 120 is updated to cancel the offset $T_{OFFSET}$. Then, the process proceeds to S499 and terminates.

Figure 5:
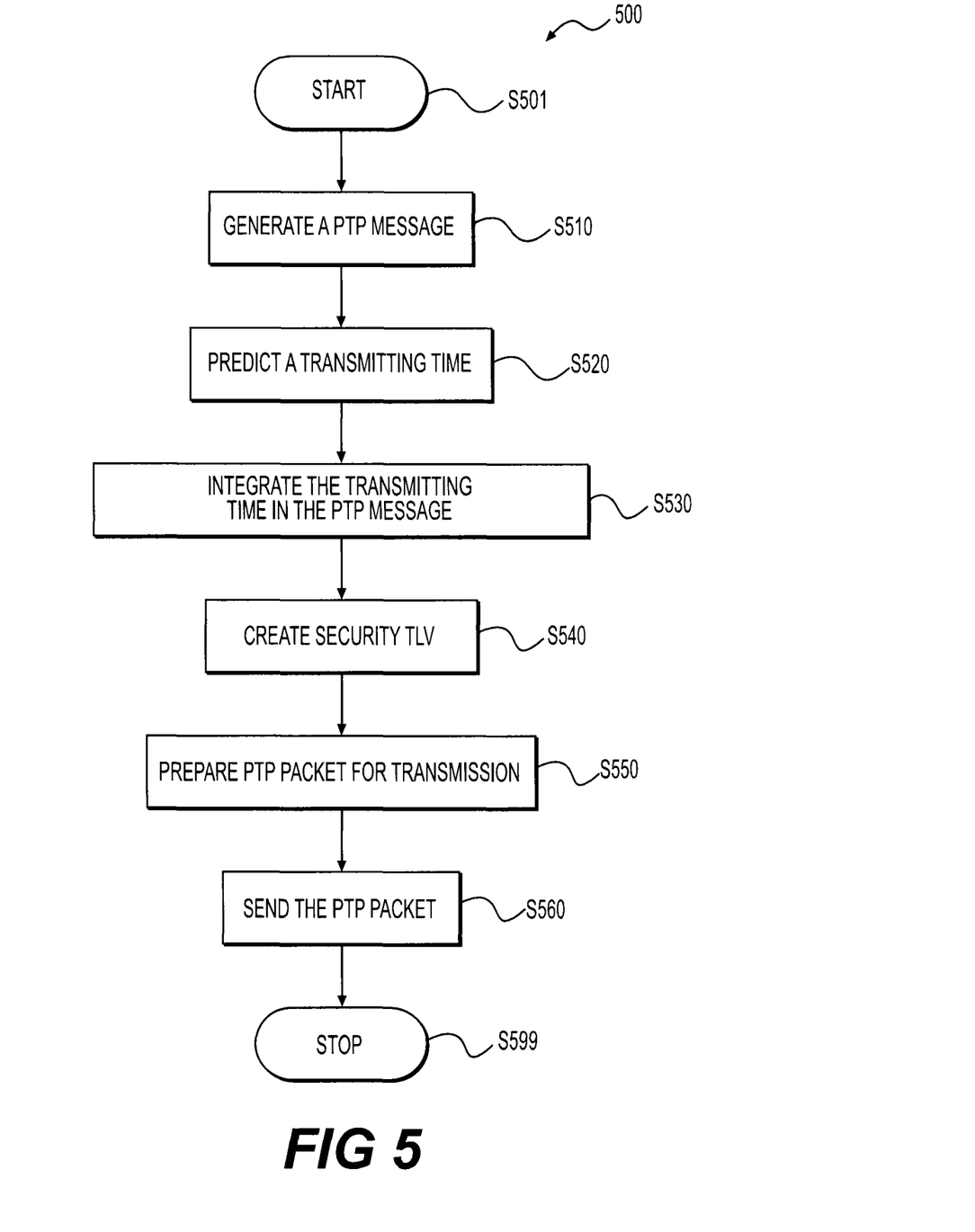
FIG. 5 shows a flow chart outlining another process example 500 performed by a master clock device according to an embodiment of the disclosure.

FIG. 5 shows a flow chart outlining another process example 500 performed by a master clock device in a time synchronization system according to an embodiment of the disclosure. In the FIG. 5 embodiment, the process 500 is used in a one-step time synchronization process that the master clock device sends one packet for time synchronization. In an example, the process 500 is executed by the first device 110 in the time synchronization system 100. The process starts at S501 and proceeds to S510.

At S510, a PTP message is generated. In an example, the first device 110 generates the PTP message to cause the clock of the second device 120 to be synchronized to the clock of the first device 110. In an example, the PTP message is a PTP packet that generally does not have security protection. For example, the first PTP message includes a first field for a transport header, a second field for a PTP header, a third field for PTP payloads and a fourth field for zero or more TLVs.

At S520, a transmitting time for the PTP message is predicted. In an example, the first device 110 predicts the transmitting time $T_{1\text{-}PREDICT}$ for the PTP message based on a status of the egress queue. For example, the first device 110 predicts a counter value of the counter in the first device 110 when the PTP message is sent out from the egress queue based on a number of packets in the egress queue waiting for transmission.

At S530, the transmitting time is integrated in the PTP message. For example, the transmitting time $T_1$ is added in the PTP payloads.

At S540, a security TLV is created based on the PTP message. In an embodiment, the security TLV is generated according to suitable security protocol, such as the IPsec protocol suite, the MACsec standard, and the like. In an example, suitable fields of the PTP message, such as at least one of the PTP header, the PTP payloads and the zero or more TLVs are encapsulated according to a security protocol to generate the security TLV.

At S550, a PTP packet with security protection is prepared for transmission. In an embodiment, the security TLV is integrated with the PTP message as a fifth field to generate the PTP packet with security protection.

At S560, the PTP packet with security protection is transmitted out. In the FIG. 1 example, the first device 110 puts the PTP packet in the egress queue for transmission. Then, the process proceeds to S599 and terminates.

Figure 6:
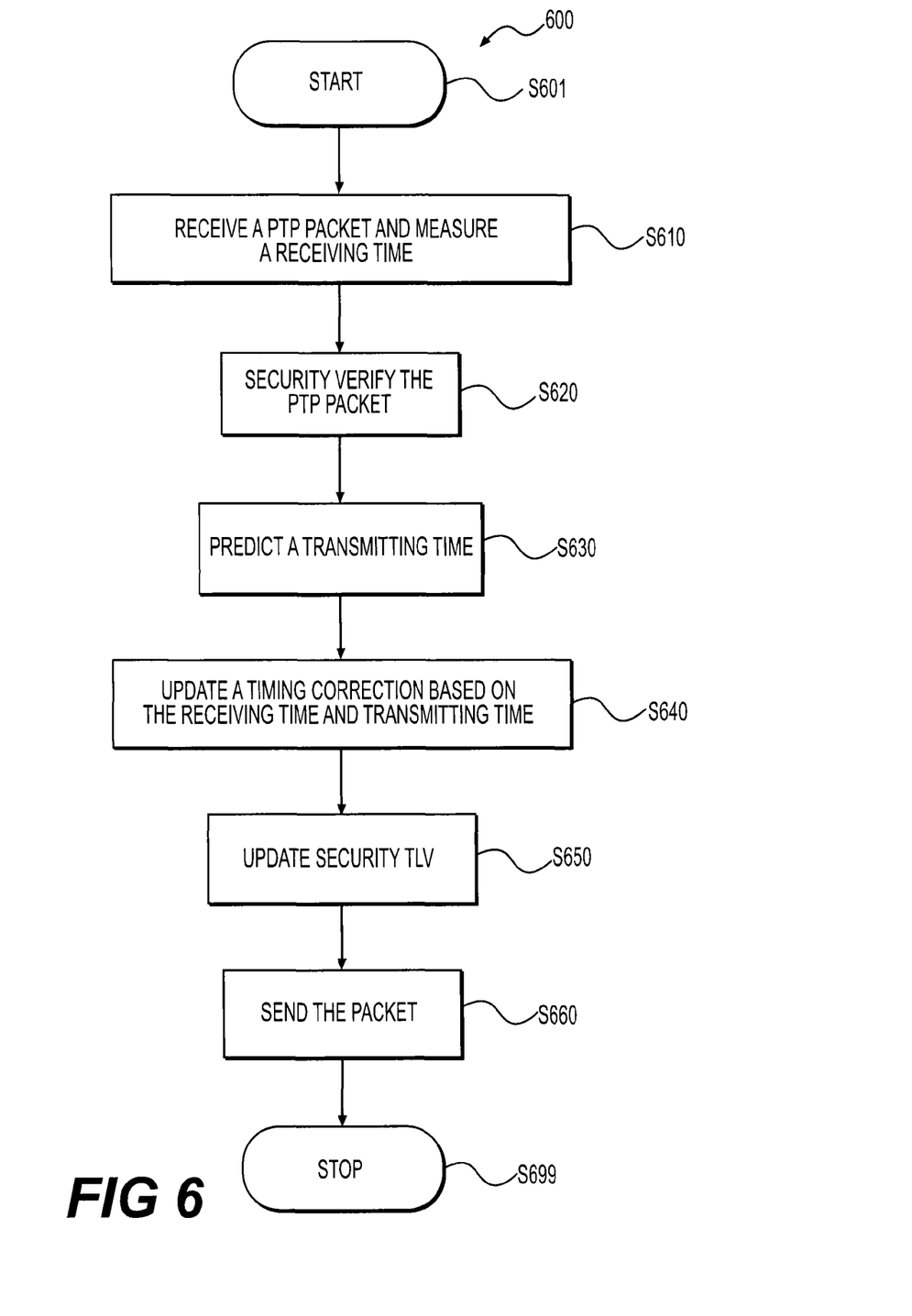
FIG. 6 shows a flow chart outlining another process example 600 performed by an intermediate device according to an embodiment of the disclosure.

FIG. 6 shows a flow chart outlining a process example 600 performed by an intermediate device according to an embodiment of the disclosure. In the FIG. 6 embodiment, the process 600 is used in a one-step time synchronization process that the intermediate device receives and forwards one packet for time synchronization. In an example, the process 600 is executed by the intermediate device 130 in the time synchronization system 100. The process starts at S601 and proceeds to S610.

At S610, a PTP packet with security protection is received, and a receiving time is measured. In an example, the intermediate device 130 receives the PTP packet with security protection, and measures a time $T_R$ when the PTP packet with security protection is received. For example, the counter of the intermediate device 130 is sampled when the receiving circuit of the intermediate device 130 receives the PTP packet, and the sampled counter value is stored in the intermediate device 130. The PTP packet includes a first field having a transport header, a second field having a PTP header, a third field having PTP payloads, a fourth field having zero or more TLVs and a fifth field having a security TLV. In an example, the PTP payloads include the predicted transmitting time $T_{1\text{-}PREDICT}$ of the PTP packet from the first device 110. The security TLV is generated according to suitable security protocol, such as the IPsec protocol suite, the MACsec standard, and the like. In an example, the security TLV includes an encapsulation of suitable fields of the PTP packet, for example at least one of the PTP header, the PTP payloads and the zero or more TLVs, according to a security protocol.

At S620, the PTP packet with security protection is security verified. In an example, to verify the security, the security TLV is used to authenticate the source of the PTP packet according to a suitable security protocol. In another example, to verify the security, the security TLV is used to check the integrity of the PTP packet according to a suitable security protocol.

At S630, a transmitting time $T_1$ for forwarding PTP packet is predicted. In an example, the intermediate device 130 predicts the transmitting time $T_{F\text{-}PREDICT}$ for forwarding the PTP packet based on a status of the egress queue for the PTP packet transmission. For example, the intermediate device 130 predicts a counter value of the counter in the intermediate device 130 when the PTP packet is forwarded out from the egress queue based on a number of packets in the egress queue waiting for transmission.

At S640, a timing correction is updated according to the receiving time $T_R$ and the predicted forwarding time $T_{F\text{-}PREDICT}$ of the PTP packet with security protection. In an example, PTP payloads of the PTP packet include a timing correction $T_C$ updated from a previous node. When the previous node is the first device 110, the timing correction $T_C$ is zero in an example. A new timing correction $T_{C\text{-}NEW}$ is calculated as a sum of the timing correction $T_C$ in the PTP packet and a time difference (e.g., $T_{F\text{-}PREDICT}-T_R$) of the forwarding time $T_{F\text{-}PREDICT}$ to the receiving time $T_R$ as shown in Eq. 3:

$$T_{C\text{-}NEW}=T_C+(T_{F\text{-}PREDICT}-T_R) \qquad \text{Eq. 3}$$

Then, the timing correction $T_C$ in the PTP payloads of the PTP packet is replaced by the new timing correction $T_{C\text{-}NEW}$.

At S650, a security TLV of the PTP packet is updated. In an embodiment, because the PTP payloads are updated with the new timing correction $T_{C\text{-}NEW}$, the security TLV is re-generated according to the suitable security protocol, such as the IPsec protocol, the MACsec protocol, and the like.

At S660, the updated PTP packet with security protection is transmitted out. In an embodiment, the intermediate device 130 puts the updated PTP packet in the egress queue for transmission, and the transmitting circuit of the intermediate device 130 transmits the PTP packet out of the intermediate device 130. The process proceeds to S699 and terminates.

Figure 7:
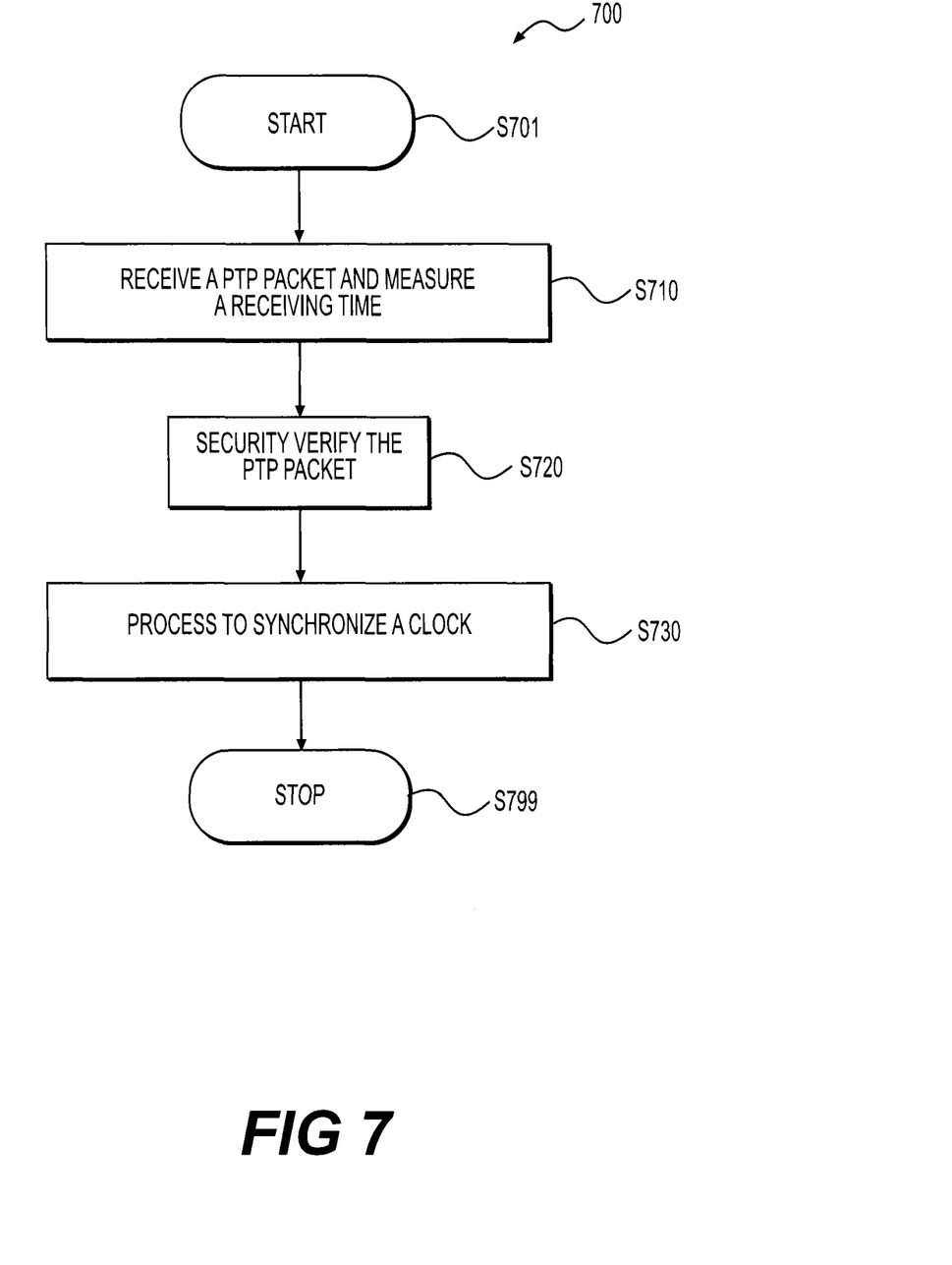
FIG. 7 shows a flow chart outlining another process example 700 performed by a slave clock device according to an embodiment of the disclosure.

FIG. 7 shows a flow chart outlining a process example 700 performed by a slave clock device in a time synchronization system according to an embodiment of the disclosure. In the FIG. 7 embodiment, the process 700 is used in a one-step time synchronization process that the slave clock device receives one packet for time synchronization. In an example, the process 700 is executed by the second device 120 in the time synchronization system 100. The process starts at S701 and proceeds to S710.

At S710, a PTP packet with security protection is received and a receiving time is measured. In an example, the second device 120 receives the PTP packet with security protection, and measures a time $T_2$ when the PTP packet with security protection is received. For example, the counter of the second device 120 is sampled when the receiving circuit of the second device 120 receives the PTP packet, and the sampled counter value is stored in the second device 120.

At S720, the PTP packet with security protection is security verified. In an embodiment, the PTP packet includes a first field having a transport header, a second field having a PTP header, a third field having PTP payloads, a fourth field having zero or more TLVs and a fifth field having a security TLV. The security TLV is generated according to suitable security protocol, such as the IPsec protocol, the MACsec protocol, and the like. In an example, the security TLV includes an encapsulation of suitable fields of the PTP packet, for example at least one of the PTP header, the PTP payloads and the zero or more TLVs, according to a security protocol. In an example, to verify the security, the security TLV is used to authenticate the source of the PTP packet according to a suitable security protocol. In another example, to verify the security, the security TLV is used to check the integrity of the PTP packet according to a suitable security protocol.

At S730, the PTP packet is processed to synchronize the clock of the second device 120 to the clock of the first device 110. In an example, the second device 120 calculates an offset $T_{OFFSET}$ of its own clock to the clock of the first device 110 based on the receiving time $T_2$ when the PTP packet is received, and information in the PTP payloads of the PTP packet. For example, the PTP payloads of the PTP packet includes the predicted transmitting time $T_{1\text{-}PREDICT}$ of the first PTP packet, and the timing correction $T_C$ that has been updated hop-by-hop along a path from the first device 110 to the second device 120. In an embodiment, the offset $T_{OFFSET}$ is a sum of the difference of $T_{1\text{-}PREDICT}$ to $T_2$ and the timing correction $T_C$, as shown by Eq. 4:

$$T_{OFFSET} = (T_{1\text{-}PREDICT} - T_2) + T_C \qquad \text{Eq. 4}$$

The offset $T_{OFFSET}$ is the offset between the master clock of the first device 110 and the slave clock of the second device 120, thus the second device 120 can be synchronized to the first device 110 based on the offset $T_{OFFSET}$. In an example, the counter circuit of the second device 120 is updated to cancel the offset $T_{OFFSET}$. Then, the process proceeds to S799 and terminates.

Figure 8:
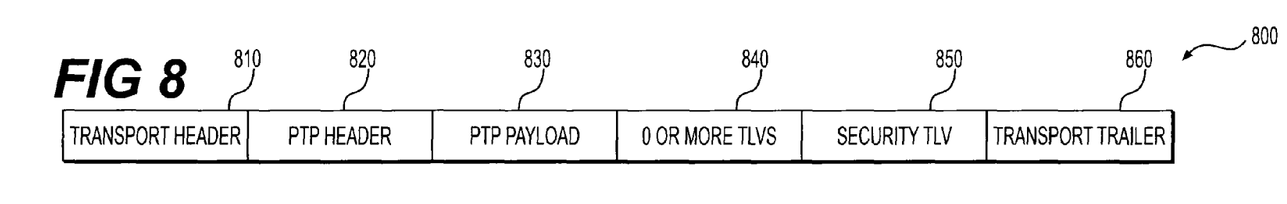
FIG. 8 shows an example of a precision time protocol (PTP) packet 800 with security protection according to an embodiment of the disclosure.

FIG. 8 shows an example of a precision time protocol (PTP) packet 800 with security protection according to an embodiment of the disclosure. The PTP packet 800 includes six fields. The first field includes a transport header 810. The transport header 810 can be any suitable header of a data link layer, a network layer and a transport layer, such as a transport header according to IPv4 with UDP, a transport header according IPv6 with UDP, a transport header according to Ethernet, a transport header according to DeviceNET, a transport header according to ControlNET, a transport header according to IEC 6158, and the like.

The second field includes a PTP header 820 that can be a header of a session layer, a presentation layer, and an application layer according to a PTP protocol.

The third field includes PTP payloads 830, such as a transmitting time, a timing correction, and the like. The fourth field is for type/length/value (TLV) 840, and can include 0 or more TLVs. The fifth field is used for security protection, and is configured as security TLV 850. The security TLV 850 can be generated according to a suitable security protocol or standard, such as IPsec protocol suite, MACsec standard, and the like. The six field includes transport trailer 860. The security TLV 850 encapsulates the fields shown in FIG. 9 or in FIG. 10, as illustrated on page 8 of U.S. Provisional Application No. 61/895,192.

Figure 9:
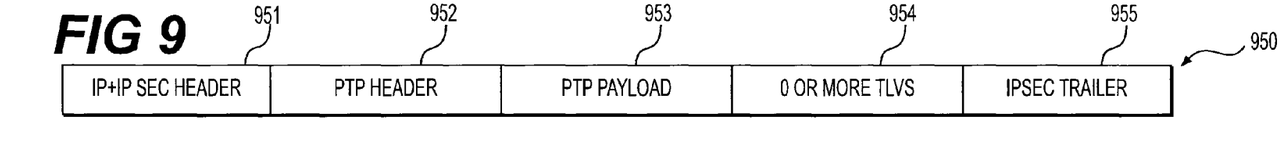
FIG. 9 shows an example of security type-length-value (TLV) 950 for a PTP packet according to an embodiment of the disclosure.

FIG. 9 shows an example of security TLV 950 for a PTP packet according to an embodiment of the disclosure. In an example, the security TLV 950 is integrated in the PTP packet 800 as the security TLV 850.

In the example, the security TLV 950 is generated according to an IPsec protocol suite in a suitable mode, such as in an encrypted mode (ESP) of the IPsec protocol suite, in an authenticated mode (AH) of the IPsec protocol suite, in a transport mode of the IPsec protocol suite, in a tunnel mode of the IPsec protocol suite, and the like. For example, the security TLV 950 includes three sub-fields. The first sub-field is for IP and IPsec header 951, and includes IP addresses representing the master clock (e.g., the first device 110). The second sub-field includes a protected encapsulation according to the IPsec, and the third sub-field includes IPsec trailer 955. In an embodiment, the protected encapsulation includes a combination of a PTP header 952 (e.g., the PTP header 820 in the second field of the PTP packet 800), PTP payloads 953 (e.g., the PTP payloads 830 in the third field of the PTP packet 800) and 0 or more TLVs 954 (e.g., the 0 or more TLVs 840 in the fourth field of the PTP packet 800). The combination is encrypted or authenticated to provide security protection.

Figure 10:
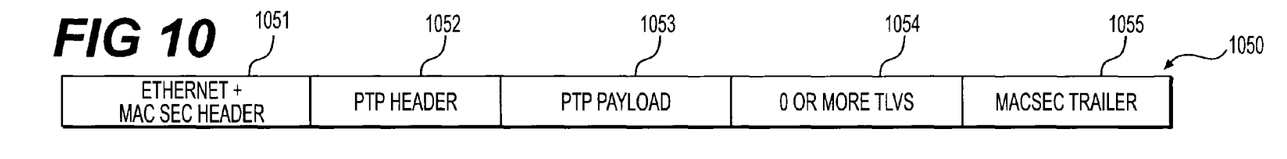
FIG. 10 shows an example of security TLV 1050 for a PTP packet according to an embodiment of the disclosure.

FIG. 10 shows an example of security TLV 1050 for a PTP packet according to an embodiment of the disclosure. In an example, the security TLV 1050 is integrated in the PTP packet 800 as the security TLV 850.

In the FIG. 10 example, the security TLV 1050 is generated according to an MACsec standard in a suitable mode, such as in an encrypted mode (ESP) of the MACsec standard, in an authenticated mode (AH) of the MACsec standard, and the like. For example, the security TLV 1050 includes three sub-fields. The first sub-field is for Ethernet and MACsec header 1051 that can include MAC addresses representing the master clock (e.g., the first device 110). The second sub-field includes a protected encapsulation according to the MACsec, and the third sub-field includes MACsec trailer 1055. In an embodiment, the protected encapsulation includes a combination of a PTP header 1051 (e.g., the PTP header 820 in the second field of the PTP packet 800), PTP payloads 1053 (e.g., the PTP payloads 830 in the third field of the PTP packet 800) and zero or more TLVs 1054 (e.g., zero or more TLVs 840 in the fourth field of the PTP packet 800). The combination is encrypted or authenticated to provide security protection.

Figure 11:
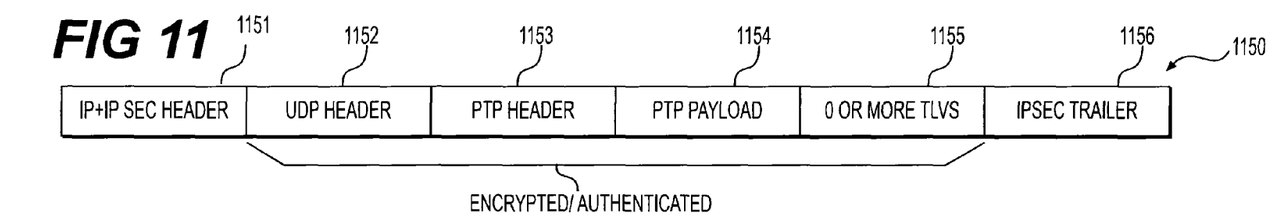
FIG. 11 shows an example of security TLV 1150 for a PTP packet according to an embodiment of the disclosure.

FIG. 11 shows an example of security TLV 1150 for a PTP packet according to an embodiment of the disclosure. In an example, the security TLV 1150 is integrated in the PTP packet 800 as the security TLV 850.

In the example, the security TLV 1150 is generated according to an IPsec protocol suite in a suitable mode, such as in an encrypted mode (ESP) of the IPsec protocol suite, in an authenticated mode (AH) of the IPsec protocol suite, in a transport mode of the IPsec protocol suite, in a tunnel mode of the IPsec protocol suite, and the like. For example, the security TLV 1150 includes three sub-fields. The first sub-field is for IP and IPsec header 1151, and includes IP addresses representing the master clock (e.g., the first device 110). The second sub-field includes a protected encapsulation according to the IPsec, and the third sub-field includes IPsec trailer 1156. In an embodiment, the protected encapsulation includes a combination of a UDP header 1152, a PTP header 1153 (e.g., the PTP header 820 in the second field of the PTP packet 800), PTP payloads 1154 (e.g., the PTP payloads 830 in the third field of the PTP packet 800) and 0 or more TLVs 1155 (e.g., the 0 or more TLVs 840 in the fourth field of the PTP packet 800). The combination is encrypted or authenticated to provide security protection.

Figure 12:
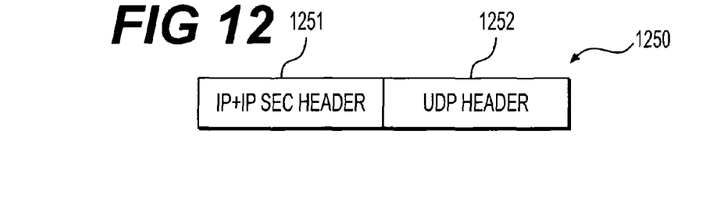
FIG. 12 shows an example of security TLV 1250 for a PTP packet according to an embodiment of the disclosure.

FIG. 12 shows an example of security TLV 1250 for a PTP packet according to an embodiment of the disclosure. In an example, the security TLV 1250 is integrated in the PTP packet 800 as the security TLV 850.

In the example, the security TLV 1250 is generated according to an IPsec protocol suite in an authenticated mode (AH) of the IPsec protocol suite. For example, the security TLV 1250 includes two sub-fields. The first sub-field is for IP and IPsec header 1251, and includes IP addresses representing the master clock (e.g., the first device 110). The second sub-field includes a UDP header 1252. The UDP header 1252 is authenticated to provide security protection.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of a time synchronization system, the method comprising:
receiving a first packet through a communication network at a first device, the first packet including a first message generated according to a precision time protocol (PTP), the first message including a first encapsulation;
security-verifying the first packet based on the first message according to a security protocol;
processing the first message according to the PTP after the first packet is security-verified, the first message including at least fields of (i) PTP header, (ii) PTP payload, (iii) zero or more type-length-values (TLVs), and (iv) the first encapsulation of security TLV that encapsulates the PTP header, the PTP payload, and the zero or more TLVs of the first message according to the security protocol; and
transmitting the first packet according to the PTP with the security verification and measuring a transmitting time.

2. The method of claim 1, further comprising:
receiving a second packet through the communication network at the first device, the second packet including a second message having a transmitting time of the first packet at a second device and a second encapsulation that encapsulates one or more fields of the second message;
security-verifying the second packet based on the second message and the second encapsulation; and
synchronizing a clock based on the transmitting time of the first packet at the second device and a receiving time of the first packet at the first device.

3. The method of claim 2, wherein the first message includes a predicted transmitting time of the first packet at the second device, and the method further comprises:
synchronizing a clock of the first device based on the predicted transmitting time of the first packet at the second device, and a receiving time of the first packet at the first device.

4. The method of claim 2, wherein the second packet includes a timing correction to account for a delay between a transmission of the first packet at the second device and a reception of the first packet at the first device.

5. The method of claim 1, further comprising:
forwarding the first packet; and
measuring a first time of receiving the first packet and a second time of transmitting the first packet.

6. The method of claim 5, further comprising:
receiving a second packet through the communication network at the first device, the second packet including a second message having a timing correction and a second encapsulation that encapsulates one or more fields of the second message;
updating the timing correction to account for a delay between the second time and the first time;
updating the second encapsulation with the updated timing correction; and
forwarding the second packet.

7. The method of claim 1, further comprising:
measuring a first time of receiving the first packet;
predicting a second time of transmitting the first packet;
updating a timing correction in the first message to account for a delay between the second time and the first time;
updating the first encapsulation with the updated timing correction; and
forwarding the updated first encapsulation.

8. An apparatus for a time synchronization system, the apparatus comprising:
a receiving circuit configured to receive a first packet through a communication network and measure a first time of receiving the first packet, the first packet including a first message generated according to a precision time protocol (PTP), the first message including a first encapsulation; and
a processor configured to security-verify the first packet based on the first message according to a security protocol, process the first message according to the PTP after the first packet is security-verified, the first message including at least fields of (i) PTP header, (ii) PTP payload, (iii) zero or more type-length-values (TLVs), and (iv) the first encapsulation of security TLV that encapsulates the PTP header, the PTP payload, and the zero or more TLVs of the first message according to the security protocol, transmit the first packet according to the PTP with the security verification, and measure a transmission time.

9. The apparatus of claim 8, wherein
the receiving circuit is configured to receive a second packet through the communication network, the second packet including a second message having a transmitting time of the first packet from another apparatus and a second encapsulation that encapsulates one or more fields of the second message; and
the processor is configured to security-verify the second packet based on the second message and the second encapsulation, and synchronize a clock based on the transmitting time of the first packet from the other apparatus and a receiving time of the first packet at the apparatus.

10. The apparatus of claim 8, wherein the first message includes a predicted transmitting time of the first packet from another apparatus, and the processor is configured to synchronize a clock of the apparatus based on the predicted transmitting time of the first packet from the other apparatus, and a receiving time of the first packet at the apparatus.

11. The apparatus of claim 9, wherein the second packet includes a timing correction to account for a delay between a transmission of the first packet at the other apparatus and a reception of the first packet at the apparatus.

12. The apparatus of claim 8, further comprising:
a transmitting circuit configured to forward the first packet, and measure a second time of transmitting the first packet.

13. The apparatus of claim 12, wherein:
the receiving circuit is configured to receive a second packet through the communication network at the apparatus, the second packet including a second message having a timing correction and a second encapsulation that encapsulates one or more fields of the second message;
the processor is configured to update the timing correction to account for a delay between the second time and the first time, and update the second encapsulation with the updated timing correction; and
the transmitting circuit is configured to forward the second packet.

14. The apparatus of claim 8, wherein
the processor is configured to predict a second time of transmitting the first packet, update a timing correction in the first message to account for a delay between the second time and the first time, and update the first encapsulation with the updated timing correction; and a transmitting circuit configured to forwarding the updated first encapsulation.

15. A non-transitory computer readable medium storing program instructions for causing a processor to execute operations for a clock synchronization system in a communication network, the operations comprising:
receiving a first packet through the communication network at a first device, the first packet including a first message generated according to a precision time protocol (PTP), the first message including a first encapsulation;
security-verifying the first packet based on the first message according to a security protocol;
processing the first message according to the PTP after the first packet is security-verified, the first message including at least fields of (i) PTP header, (ii) PTP payload, (iii) zero or more type-length-values (TLVs), and (iv) the first encapsulation of security TLV that encapsulates the PTP header, the PTP payload, and the zero or more TLVs of the first message according to the security protocol; and
transmitting the first packet according to the PTP with the security verification and measuring a transmitting time.

16. The non-transitory computer readable medium of claim 15, the operations further comprising:
receiving a second packet through the communication network at the first device, the second packet including a second message having a transmitting time of the first packet at a second device and a second encapsulation that encapsulates one or more fields of the second message;
security-verifying the second packet based on the second message and the second encapsulation; and
synchronizing a clock based on the transmitting time of the first packet at the second device and a receiving time of the first packet at the first device.

17. The non-transitory computer readable medium of claim 16, wherein the first message includes a predicted transmitting time of the first packet at the second device, and the operations further comprising:
synchronizing a clock of the first device based on the predicted transmitting time of the first packet at the second device, and a receiving time of the first packet at the first device.

18. The non-transitory computer readable medium of claim 16, wherein the second packet includes a timing correction to account for a delay between a transmission of the first packet at the second device and a reception of the first packet at the first device.

19. The non-transitory computer readable medium of claim 15, wherein the first packet is forward and a first time of receiving the first packet and a second time of transmitting the first packet are measured, and the operations further comprising:
receiving a second packet through the communication network at the first device, the second packet including a second message having a timing correction and a second encapsulation that encapsulates one or more fields of the second message;
updating the timing correction to account for a delay between the second time and the first time; and
updating the second encapsulation with the updated timing correction.

20. The non-transitory computer readable medium of claim 15, wherein a first time of receiving the first packet is measured, the operations further comprise:
predicting a second time of transmitting the first packet;
updating a timing correction in the first message to account for a delay between the second time and the first time; and
updating the first encapsulation with the updated timing correction.

* * * * *